(12) United States Patent
Irwan et al.

(10) Patent No.: US 10,046,749 B2
(45) Date of Patent: Aug. 14, 2018

(54) BRAKE SYSTEM AND METHOD OF OPERATING

(71) Applicant: Robert Bosch GmbH, Stuttgart (DE)

(72) Inventors: Rosalin Irwan, Ann Arbor, MI (US); Quingyuan Li, Superior Township, MI (US); Wenguang Zhou, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 15/373,449

(22) Filed: Dec. 8, 2016

(65) Prior Publication Data

US 2018/0162341 A1   Jun. 14, 2018

(51) Int. Cl.
| | |
|---|---|
| *B60T 13/66* | (2006.01) |
| *B60T 17/22* | (2006.01) |
| *B60T 13/74* | (2006.01) |
| *B60T 8/40* | (2006.01) |
| *B60T 8/171* | (2006.01) |

(52) U.S. Cl.
CPC .......... *B60T 17/221* (2013.01); *B60T 8/171* (2013.01); *B60T 8/4081* (2013.01); *B60T 13/745* (2013.01); *B60T 2270/404* (2013.01); *B60T 2270/82* (2013.01)

(58) Field of Classification Search
CPC . B60T 7/042; B60T 8/34; B60T 8/268; B60T 8/3655; B60T 8/4081
USPC ...... 303/3, 7, 10, 113.2, 113.4, 114.1, 115.1, 303/115.2
See application file for complete search history.

(56) References Cited

U.S. PATENT DOCUMENTS

| | | | |
|---|---|---|---|
| 4,827,416 A | 5/1989 | Kawagoe et al. | |
| 5,209,554 A | 5/1993 | Beilfuss et al. | |
| 5,984,435 A | 11/1999 | Tsukamoto et al. | |
| 6,007,161 A | 12/1999 | Worsdorfer | |
| 6,149,247 A * | 11/2000 | Hofmann | B60T 8/3655 |
| | | | 303/113.2 |
| 6,398,319 B1 | 6/2002 | Wilson et al. | |

(Continued)

FOREIGN PATENT DOCUMENTS

| | | |
|---|---|---|
| CN | 201534540 U | 7/2010 |
| DE | 10342937 A1 | 4/2005 |

(Continued)

*Primary Examiner* — Christopher P Schwartz
(74) *Attorney, Agent, or Firm* — Michael Best & Friedrich LLP (57) ABSTRACT

A vehicle braking system includes a brake pedal, master cylinder, a braking circuit with a wheel cylinder, and a brake pressure generator. A pedal feel simulator is coupled to the master cylinder output side through a switchable valve, the pedal feel simulator providing a reaction force. An isolation valve closes to isolate the braking circuit from the master cylinder and the simulator circuit. A primary pressure sensor generates a braking request signal responsive to the brake pedal. A controller activates the brake pressure generator to apply a braking force to the wheel cylinder based on the braking request signal. The controller identifies an abnormal value from the primary pressure sensor and couples the pedal feel simulator with a secondary pressure sensor within the braking circuit to determine whether the abnormal value indicates a primary pressure sensor malfunction or a malfunction of the pedal feel simulator or the switchable simulator valve.

19 Claims, 3 Drawing Sheets

(56) References Cited

U.S. PATENT DOCUMENTS

| | | |
|---|---|---|
| 6,533,369 B2 | 3/2003 | Baumgartner et al. |
| 6,588,855 B2 | 7/2003 | Harris |
| 7,344,206 B2 * | 3/2008 | Schmidt .................. B60T 8/34 188/352 |
| 7,484,815 B2 | 2/2009 | Ogawa et al. |
| 7,497,528 B2 | 3/2009 | Reuter et al. |
| 7,748,794 B2 | 7/2010 | Tsunehara et al. |
| 7,770,982 B2 | 8/2010 | Gottwick et al. |
| 7,823,985 B2 | 11/2010 | Hatano |
| 7,823,986 B2 | 11/2010 | Ruffer et al. |
| 8,297,715 B2 | 10/2012 | Nishikawa et al. |
| 8,376,475 B2 | 2/2013 | Ruffer et al. |
| 8,447,486 B2 | 5/2013 | Nakata et al. |
| 8,870,302 B2 | 10/2014 | Baek |
| 8,936,322 B2 | 1/2015 | Klimes et al. |
| 9,096,206 B2 | 8/2015 | Linkenbach et al. |
| 9,358,964 B2 | 6/2016 | Ito et al. |
| 2001/0022254 A1 * | 9/2001 | Hofmann ................ B60T 7/042 188/40 |
| 2003/0020327 A1 | 1/2003 | Isono et al. |
| 2004/0040807 A1 | 3/2004 | Burgdorf et al. |
| 2004/0183369 A1 * | 9/2004 | Soga ...................... B60T 8/268 303/113.4 |
| 2009/0039702 A1 | 2/2009 | Nishino et al. |
| 2013/0218407 A1 * | 8/2013 | Jungbecker ............. B60T 7/042 701/34.4 |
| 2014/0174072 A1 | 6/2014 | Ishizuka |
| 2014/0346852 A1 * | 11/2014 | Thrasher ............... B60T 8/4081 303/10 |
| 2015/0151747 A1 | 6/2015 | Fairgrieve et al. |
| 2016/0236664 A1 | 8/2016 | Aoki et al. |

FOREIGN PATENT DOCUMENTS

| | | |
|---|---|---|
| DE | 102011077169 A1 | 12/2012 |
| EP | 1671865 A1 | 6/2006 |
| EP | 1975024 A1 | 10/2008 |
| EP | 2671769 A1 | 12/2013 |
| EP | 3056398 A1 | 8/2016 |
| JP | 11255087 A | 9/1999 |
| JP | 2014094625 A | 5/2014 |
| JP | 2016147644 A | 8/2016 |

* cited by examiner

BRAKE SYSTEM AND METHOD OF OPERATING

BACKGROUND

The present invention relates to vehicle brake systems. It is known to provide a vehicle with a full-power brake system (also referred to as a "decoupled" or "brake-by-wire" system) in which driver applied force does not propagate to produce the actual braking force to the brake devices. Instead, fluid is pushed from the master cylinder into a simulator circuit while another mechanism provides the actual braking force. Although satisfactory for the intended purpose, a great number of valves and sensors must all be in working order to provide brake-by-wire operation, and it can be difficult to diagnose faults within the system.

SUMMARY

In one aspect, the invention provides a vehicle braking system including a master cylinder having an input side configured to receive an input from a brake pedal and an output side configured to provide a master cylinder output. At least one braking circuit has at least one wheel cylinder and a brake pressure generator separate from the brake pedal. A simulator circuit includes a pedal feel simulator coupled to the master cylinder output side through a switchable simulator valve, the pedal feel simulator providing a reaction force to the brake pedal when the switchable simulator valve is in an open position. At least one normally-open isolation valve is operable to close and isolate the at least one braking circuit from the master cylinder and the simulator circuit. A primary pressure sensor is operable to generate a braking request signal responsive to the input from the brake pedal. A controller is programmed to activate the brake pressure generator to apply a braking force to the at least one wheel cylinder of the braking circuit based on the braking request signal from the primary pressure sensor. The controller is programmed to close the at least one normally-open isolation valve during activation of the brake pressure generator so that the master cylinder is coupled to the simulator circuit and decoupled from the braking circuit. The controller is further programmed to identify an abnormal value for the braking request signal from the primary pressure sensor, and in response, the controller is programmed to open the at least one normally-open isolation valve and to observe a relationship between brake pedal actuation and pressure generated at the master cylinder output side using a secondary pressure sensor that is positioned in the braking circuit such that the controller determines whether the abnormal value is indicative of a primary pressure sensor malfunction or indicative of a malfunction of at least one of the pedal feel simulator and the switchable simulator valve.

In another aspect, the invention provides a method of operating a vehicle braking system. An input is received from a brake pedal at an input side of a master cylinder and a master cylinder output is provided corresponding to the brake pedal input at an output side of the master cylinder output. By a controller signal, at least one normally-open isolation valve is closed to isolate the output side of the master cylinder from at least one braking circuit having at least one wheel cylinder. By a controller signal, a switchable simulator valve is opened to open a fluid connection between the master cylinder output side and a simulator circuit including a pedal feel simulator to provide a reaction force to the brake pedal. A braking request signal is generated with a primary pressure sensor responsive to the input from the brake pedal, the braking request signal being sent to a controller. A brake pressure generator of the at least one braking circuit, separate from the brake pedal, is driven with the controller responsive to the braking request signal to achieve braking at the at least one wheel cylinder. The controller identifies an abnormal value for the braking request signal from the primary pressure sensor. A controller signal is sent, in response to identifying the abnormal value, to open the at least one normally-open isolation valve and to observe a relationship between brake pedal actuation and pressure generated at the master cylinder output side using a secondary pressure sensor that is positioned in the braking circuit. The controller determines, based on the observed relationship, whether the abnormal value is indicative of a primary pressure sensor malfunction or indicative of a malfunction of at least one of the pedal feel simulator and the switchable simulator valve.

DETAILED DESCRIPTION

Before any embodiments of the invention are explained in detail, it is to he understood that the invention is not limited in its application to the details of construction and the arrangement of components set forth in the following description or illustrated in the following drawings. The invention is capable of other embodiments and of being practiced or of being carried out in various ways.

Figure 1:
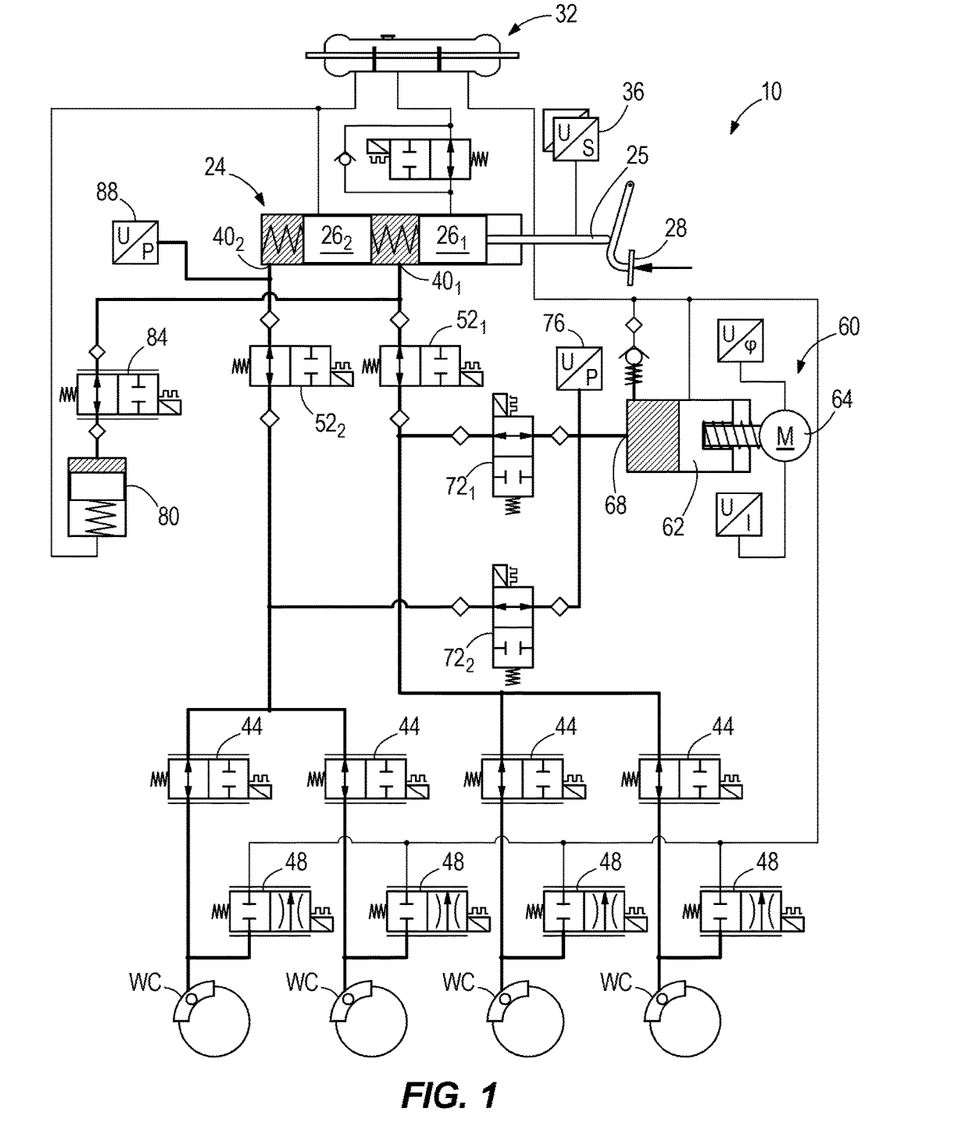
FIG. 1 is a schematic drawing of a vehicle braking system according to one aspect of the present invention. A diagnostic system configuration during initial braking is illustrated.

The braking system 20 of FIG. 1 includes a master cylinder 24 having an input side coupled with an input rod 25 to a brake pedal 28 to pressurize hydraulic fluid therein. The master cylinder 24 includes a first piston $26_1$ that is coupled to the brake pedal 28 to move directly therewith. The first piston $26_1$ pressurizes hydraulic fluid in a first chamber of the master cylinder 24 to be output from the first chamber at a first outlet $40_1$. A second piston $26_2$ of the master cylinder 24 can be moved under the influence of fluid pressurized in the first chamber by the first piston $26_1$, without the second piston $26_2$ having any direct connection to the first piston $26_1$ or the brake pedal 28. The second piston $26_1$ pressurizes hydraulic fluid in a second chamber of the master cylinder 24 to be output from the second chamber at a second outlet $40_2$. A fluid reservoir 32 is in fluid communication with the first and second chambers of the master cylinder 24 until the brake pedal 28 is initially actuated, at which time the pistons $26_1$, $26_2$ block off the master cylinder chambers from the reservoir 32. A pedal travel sensor 36 is coupled to the brake pedal 28 and is operable to detect an amount of travel of the brake pedal 28, so that a corresponding signal can be sent to a controller (not shown). The controller can be a computer electrically coupled with each sensor and each electrically-operable valve of the braking system 20, to send signals thereto and/or receive signals therefrom to establish communication and control necessary to operate the braking system 20.

The dual outputs $40_1$, $40_2$ of the master cylinder 24 are selectively in fluid communication with a first braking circuit and a second braking circuit, respectively. In the illustrated construction, each of the braking circuits includes a pair of brake devices or wheel cylinders WC operable to slow down the wheels of a vehicle on which the braking system 20 is provided. The wheel cylinders WC of a particular circuit can be associated with a set of front vehicle wheels, a set of rear vehicle wheels, or a set of diagonal vehicle wheels. Each braking circuit includes an inlet valve 44 and an outlet valve 48 associated with each respective wheel cylinder WC. The inlet valves 44 are normally-open and can be electrically closed by the controller to stop or limit pressurized hydraulic fluid supplied to the wheel cylinder WC. The outlet valves 48 are normally-closed and can be electrically opened by the controller to relieve pressurized hydraulic fluid at the wheel cylinder WC, to the reservoir 32. Each of the master cylinder outlets $40_1$, $40_2$ is coupled to one of the braking circuits through a normally-open isolation valve $52_1$, $52_2$. Each of the isolation valves $52_1$, $52_2$ is operable to be closed by the controller to fluidly separate or isolate the master cylinder 24, and thus the brake pedal 28, from the braking circuits having the wheel cylinders WC.

Although the master cylinder 24 is capable of providing mechanical braking from the brake pedal 28 to the wheel cylinders WC of the two braking circuits, the system 20 can be provided with an alternate or auxiliary device, separate from the brake pedal 28 and referred to herein as a brake pressure generator 60, for generating hydraulic fluid pressure to the wheel cylinders WC for the requisite braking need. The brake pressure generator 60 can include a plunger or piston 62 drivable in a cylinder by an actuator such as an electric motor 64 operated by the controller. As such, the brake pressure generator 60 is operable to drive pressurized hydraulic fluid to the wheel cylinders WC of the first and second braking circuits. For example, an outlet 68 of the brake pressure generator 60 can be coupled, in parallel, to the first and second braking circuits through respective apply pressure control valves $72_1$, $72_2$. Each of the apply pressure control valves $72_1$, $72_2$ can be a controller-modulated solenoid valve (e.g., having a range of open positions, or receiving a pulse-width modulation signal to achieve a similar effect) operable to control the pressure supplied from the brake pressure generator 60 to the wheel cylinders WC of the given braking circuit. The apply pressure control valves $72_1$, $72_2$ can be coupled to respective brake fluid supply lines or passages, each of which extends between one of the isolation valves $52_1$, $52_2$ and the respective inlet valves 44 of the braking circuit. One or more pressure sensors 76 can be positioned along the fluid path between the brake pressure generator outlet 68 and the respective inlet valves 44 and operable to report the fluid pressure to the controller. The pressure sensor 76 can be referred to as an "active circuit" pressure sensor as it senses and reports the fluid pressure in the passage(s) coupled to the wheel cylinders WC, as contrasted with fluid pressure in the master cylinder 24 or a simulator circuit, which are not part of an active braking circuit during brake-by-wire operation. Additional sensors may be provided to monitor parameters of the piston 62 and/or the electric motor 64, and may include any one or more of: linear or angular position, electrical current, electrical voltage, force, torque, or temperature.

In addition to the active braking components in the system 20, a simulator circuit is provided in fluid communication with the output side of the master cylinder 24. The simulator circuit is provided upstream of the isolation valves $52_1$, $52_2$, meaning the side nearer the master cylinder and remote from the braking circuits so that the simulator circuit is kept in fluid communication with the master cylinder 24 when the isolation valves $52_1$, $52_2$ are closed. The simulator circuit includes a pedal feel simulator 80 coupled to an outlet of the master cylinder 24 (e.g., the first outlet $40_1$) through a switchable simulator valve 84. The simulator valve 84 can be a normally-closed switchable solenoid valve operable to be opened by the controller to establish fluid communication between the master cylinder outlet $40_1$ and the pedal feel simulator 80. When the simulator valve 84 is open, fluid pushed out of the master cylinder chamber through the outlet $40_1$ is passed into the pedal feel simulator 80, which has a biasing mechanism that provides a feedback force to the brake pedal 28. Thus, the simulator circuit mimics the feel of actuating the wheel cylinders WC when in fact the brake pedal 28 is decoupled by the isolation valves $52_1$, $52_2$ from the actual braking pressure activating the wheel cylinders WC in the braking circuits. A pressure sensor, referred to herein as the primary pressure sensor 88, is provided in fluid communication with the master cylinder 24 to detect a fluid pressure generated in one of the master cylinder chambers. For example, the primary pressure sensor 88 can be coupled to the second master cylinder outlet $40_2$, upstream of the isolation valve $52_2$. The primary pressure sensor 88 is operable to generate a braking request signal responsive to an input force from the brake pedal 28.

Though not conducive to labeling in FIG. 1, it will be understood that each braking circuit extends from one of the isolation valves $52_1$, $52_2$ to the respective wheel cylinder(s) WC, and further includes the passages connecting to the brake pressure generator 60, and the respective passages connecting to the fluid reservoir 32, while the simulator circuit is a separate circuit, not part of either of the braking circuits, since fluid in the simulator circuit is not conveyed to contribute to actual braking force at the wheel cylinders WC.

During normal operation of the braking system 20, the brake pedal 28 is decoupled from the wheel cylinders WC so that braking occurs fully in a primary brake-by-wire mode. When the driver depresses the brake pedal 28, the isolation valves $52_1$, $52_2$ are actuated to a closed position (opposite the position shown in FIG. 1) so that the master cylinder 24 and the simulator circuit are cut-off or isolated from the braking circuits. The simulator valve 84 is also switched open by the controller upon initial actuation of the brake pedal 28, which can be detected by the pedal travel sensor 36. A pressure increase occurs in the second master cylinder chamber and between the second outlet $40_2$ and the second isolation valve $52^2$ since the pedal 28 urges the pistons $26_1$, $26_2$ to move toward the closed-off second isolation valve $52_2$. The pressure increase is measured or detected by the primary pressure sensor 88 and conveyed as a signal to the controller, which is programmed to use the information to determine the degree of actuation of the brake pressure generator 60 to achieve a target brake force as requested by the driver's actuation of the brake pedal 28. In some constructions, an output of the pedal travel sensor 36 is also considered by the controller along with the primary pressure sensor 88 in quantifying the driver's braking request. The controller can also provide variable manipulation of the apply pressure control valves $72_1$, $72_2$ to achieve a desired brake force and brake force balance in the braking circuits. Thus, in the illustrated construction, the motor 64 is energized as programmed by the controller to drive the piston 62 forward in the cylinder toward the outlet 68 so that fluid pressure is generated at the outlet and hydraulic fluid is moved from the brake pressure generator 60 toward the wheel cylinders WC, which may include one or more pistons incorporated into brake calipers so that the hydraulic fluid from the generator 60 causes the wheel cylinders WC to squeeze onto a brake disc. As can be interpreted from this description, the brake pressure generator 60 is controlled to achieve an amount of braking according to the driver's request, which is interpreted at least in part by the primary pressure sensor 88, which continuously measures how hard the driver is applying pressure to the brake pedal 28. In the event of a component failure or abnormality, the braking system 20 is designed to provide a back-up mode of operation in which the isolation valves $52_1$, $52_2$ return to their normally-open positions to allow the brake pedal 28 to actuate the wheel cylinders WC through the master cylinder 24. However, the invention provides a diagnostic routine to determine whether to transition to a direct mechanical push-through back-up mode or to a secondary brake-by-wire mode when a malfunction occurs in the primary, normal mode of brake-by-wire operation.

During operation of the braking system 20, the controller is programmed to identify an abnormal value for the braking request signal generated from the primary pressure sensor 88. For example, the controller may be programmed with an expected range of values, and can identify when the value output from the primary pressure sensor 88 is outside of the expected range. The expected range can also be dependent upon another input, such as pedal travel or stroke determined by the pedal travel sensor 36. The controller is programmed to identify the abnormal value as a value which is unlikely or impossible to represent a factual reading of a properly-operating system. In other words, the primary pressure sensor 88 is not working properly to sense and report fluid pressure accurately, or the primary pressure sensor 88 is accurately sensing and reporting and the value is abnormal due to a mechanical failure such as a leak, a stuck simulator valve 84, or a stuck pedal feel simulator 80. Rather than abandon brake-by-wire operation of the braking system 20, the controller is programmed to take further action toward a resolution of the abnormal value from the primary pressure sensor 88.

Upon identifying the abnormal value for the braking request at the initial onset of brake pedal actuation, the controller is programmed to put the braking system 20 into a diagnostic configuration as shown in FIG. 1. For the diagnostic configuration, the controller is programmed to open (i.e., not actuate closed) the first isolation valve $52_1$ and may also be programmed to open the second isolation valve $52_2$. This is atypical and opposite from the normal primary mode of operation in which both isolation valves $52_1$, $52_2$ are maintained closed by the controller while the brake pedal 28 is depressed. Opening the first isolation valve $52_1$ places the simulator circuit, in particular the simulator valve 84 and the pedal feel simulator 80, in fluid communication with the corresponding braking circuit. As such, fluid communication is established between the simulator circuit and the pressure sensor 76 that is positioned in the braking circuit, in particular the pressure sensor 76 positioned between the brake pressure generator outlet 68 and the apply pressure control valves $72_1$, $72_2$. The pressure sensor 76 may be referred to herein as a "secondary" pressure sensor as it is used as a secondary or back-up sensor when the primary pressure sensor 88 gives an abnormal value. Optionally opening the second isolation valve $52_2$ for the diagnostic configuration puts the primary pressure sensor 88 and the secondary pressure sensor 76 in fluid communication and allows their outputs to be compared.

Figure 2:
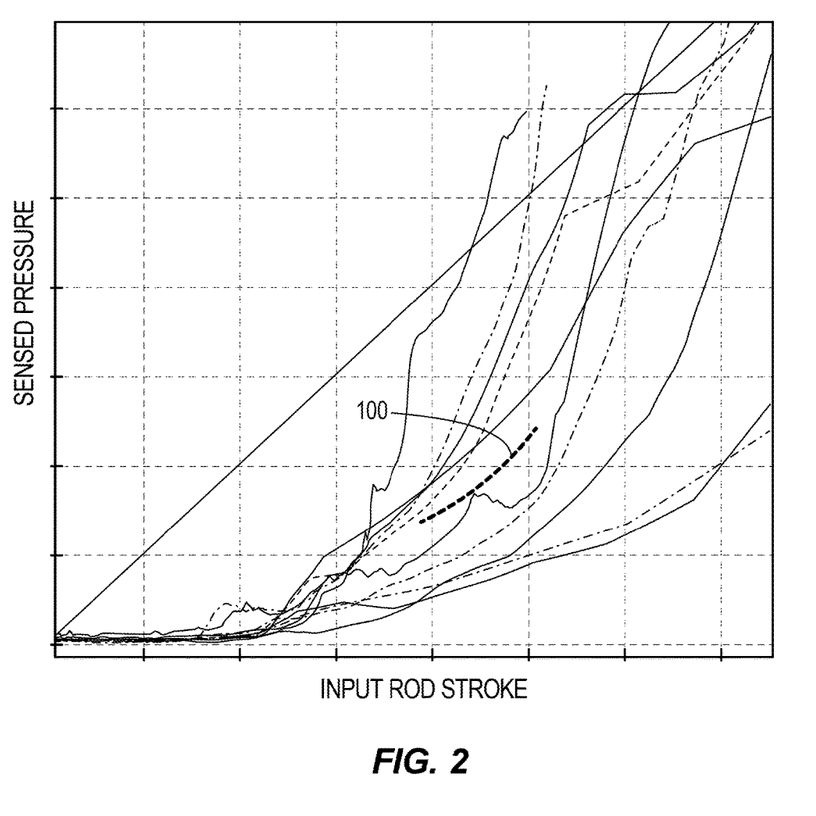
FIG. 2 is a graph of sensed pressure versus input rod stroke, including a separation curve distinguishing normal response curves from hard pedal response curves.

The controller is programmed to maintain the first apply pressure control valve $72_1$ in an open position while the brake pedal 28 is depressed and the first isolation valve $52_1$ is left open. Thus, the system 20 is put into a diagnostic mode or routine by which the controller can evaluate a relationship between brake pedal actuation and fluid pressure generated at the master cylinder output side, as measured by the secondary sensor 76 within the braking circuit. The controller can command the simulator valve 84 to be open during the diagnostic routine. The brake pressure generator 60 may provide a fluid volume boost to the braking circuit during the diagnostic mode. For example, the controller may be programmed to provide a predetermined actuation amount for the motor 64 to drive the piston 62 since the simulator circuit is being connected with the active braking circuit and potentially consuming an amount of fluid volume. In observing the relationship between brake pedal travel and the resulting fluid pressure increase, the information observed by the controller is represented by the graph of FIG. 2. The x-axis represents brake pedal actuation, or "input rod stroke" as labeled, from the pedal travel sensor 36, while the y-axis represents the sensed fluid pressure, in other words, the output of the secondary sensor 76. FIG. 2 illustrates a variety of exemplary plots or traces that may be observed by the controller during the diagnostic routine. The controller is programmed with a separation curve 100 that divides the potential graph area into two sides. When the results of the diagnostic routine place the collected data to the left of the separation curve 100, this indicates a "hard pedal" condition. In other words, the pressure rises significantly faster than expected as the brake pedal 28 is stroked. When the results of the diagnostic routine place the collected data to the right of the separation curve 100, this indicates a good check or satisfactory condition. The separation curve 100 may be defined in a particular region, such as a central region, of the total available travel range of the brake pedal 28 where the evaluated data points do not include the initial travel range or the final travel range of the brake pedal 28. The controller may also be programmed to not confirm satisfactory operation if the fluid pressure does not increase beyond a predetermined amount, indicative of a circuit leak.

The diagnostic routine serves as a hardware check that allows the controller to determine whether the abnormal value from the primary pressure sensor 88 is due to a failure of the sensor 88 to perform, or is due to mechanical failure of the simulator circuit (e.g., simulator valve 84 not opening, pedal feel simulator 80 stuck and not receiving fluid). In the case of a mechanical failure in the simulator circuit, the braking system 20 may not be enabled to perform brake-by-wire braking, since the simulator circuit is required to accept the fluid from the master cylinder 24 when the braking pressure comes from a source other than the master cylinder 24. However, when the controller can determined based on the diagnostic routine that there is nothing mechanically wrong with the simulator circuit, the system 20 can be put into a secondary brake-by-wire mode by the controller. For example, though the primary pressure sensor 88 can no longer be relied upon, the controller may be programmed to get a braking request signal from an alternate sensor, such as the pedal travel sensor 36. This method of operation enables the braking system 20 to perform in a more sophisticated manner and achieve better performance, by retaining brake-by-wire operation when the primary pressure sensor 88 fails, as long as the operability of the simulator circuit hardware is confirmed in the diagnostic routine.

Figure 3:
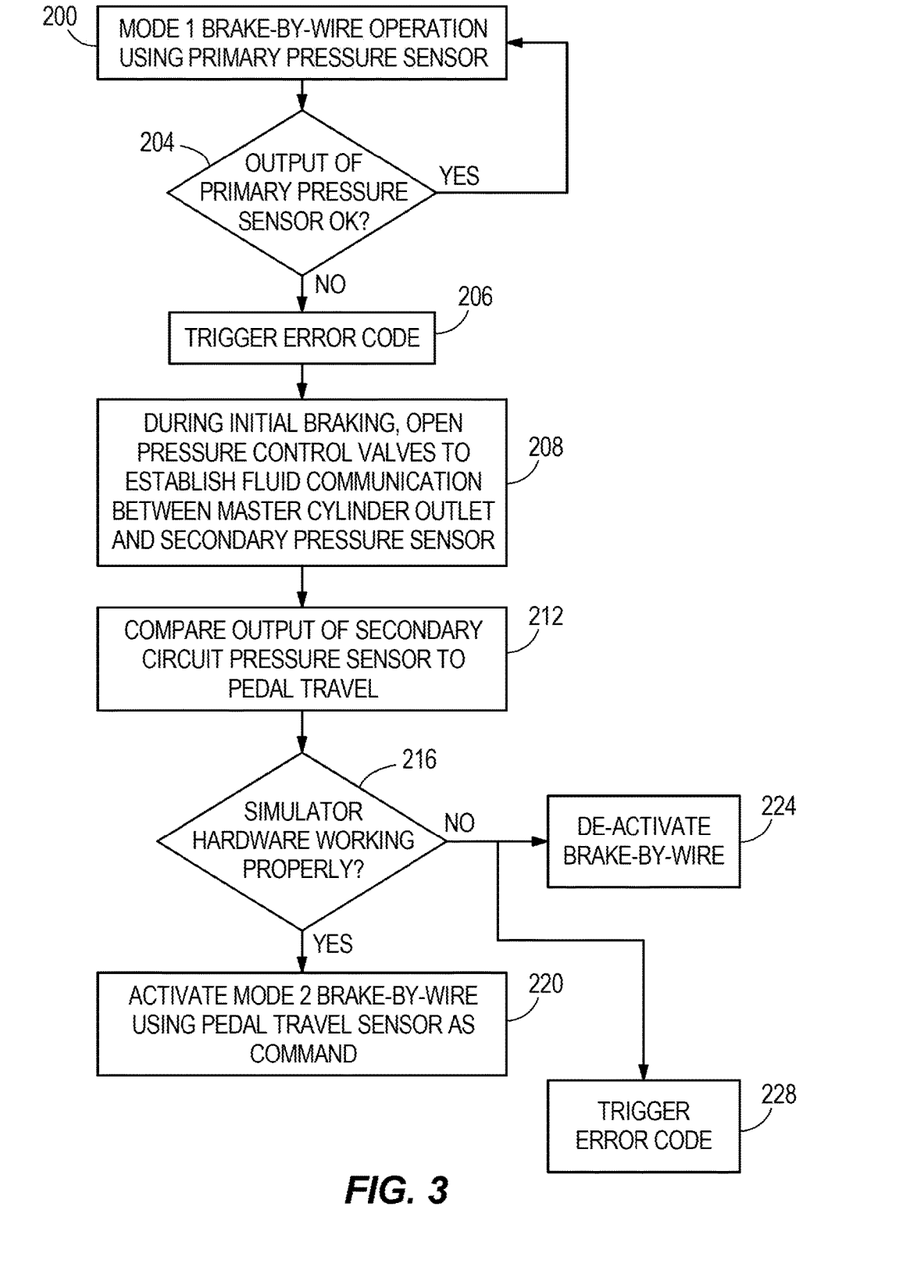
FIG. 3 is a flow diagram illustrating steps of a method according to one aspect of the invention.

The process carried out by the program of the controller as described above is visually represented in the flow diagram of FIG. 3. At step 200, the controller operates the braking system 20 in a first mode, which is the normal or primary brake-by-wire mode in which the braking force (i.e., hydraulic fluid pressure) to the wheel cylinders WC is produced by the brake pressure generator 60, not the master cylinder 24, in proportion to the driver's demand as manifested by the fluid pressure sensed by the primary pressure sensor 88. The apply pressure control valves $72_1$, $72_2$ may open and close as required to modulate the pressure to the two braking circuits. During step 200, the simulator valve 84 is open and the two isolation valves $52_1$, $52_2$ are closed. At step 204, the controller checks the output of the primary pressure sensor 88 to identify any abnormality. In the event an abnormality is detected, an error code is triggered at step 206 before continuing to step 208. Examples of the manner in which the controller detects the abnormality have been described above. If the output of the primary pressure sensor 88 is determined to be good, the braking system 20 continues operating in the first mode at step 200. At step 208, the controller puts the braking system 20 into a configuration for the diagnostic routine. This includes, during initial braking by the driver depressing upon the brake pedal 28, opening the apply pressure control valve $72_1$ and leaving the isolation valve $52_1$ open (i.e., avoiding or ceasing a signal to actuate closed) to establish fluid communication between the simulator circuit, the master cylinder outlet $40_1$, and the secondary pressure sensor 76. In the configuration for the diagnostic routine at step 208, the simulator valve 84 is actuated to open. The braking system 20, in particular the program of the controller, then carries out the diagnostic routine to determine whether the abnormal output of the primary pressure sensor 88 can be attributed to a fault with the primary pressure sensor 88, or rather, a fault with the mechanical components, such as those of the simulator circuit. In some constructions, the second isolation valve $52_2$ is also opened (i.e., not actuated closed) for the diagnostic configuration so that the primary pressure sensor 88 and the secondary pressure sensor 76 are in fluid communication, and their outputs compared.

At step 212, the controller is programmed to compare the output of the secondary pressure sensor 76 to brake pedal travel, or input rod stroke, as measured by the pedal travel sensor 36 and provided as a signal to the controller. Thus, the controller can observe the relationship between brake pedal travel and the resulting fluid pressure increase and can compare this data to data stored in a memory of the controller (e.g., the data of the separation curve 100 of FIG. 2) to determine if the simulator hardware is in proper working condition at step 216. As described above, this can include determining whether a "hard pedal" condition has occurred in which very limited pedal travel results in an abundant fluid pressure increase. If this is the case, and the abnormality of the primary pressure sensor 88 was an abnormally high output, the controller determines that there is a mechanical fault in the simulator circuit that is preventing the pedal feel simulator 80 from receiving fluid in the designed manner, such as the pedal feel simulator 80 having an internal component (e.g., a spring) being stuck or the simulator valve 84 being stuck closed. When the controller determines that the simulator hardware is working properly, the process continues to step 220 to activate a secondary brake-by-wire mode as a back-up. When the controller determines that the simulator hardware is not working properly, the process continues to step 224 to deactivate brake-by-wire operation, thus activating a "coupled" or "direct" braking mode in which fluid pressure at the master cylinder 24 is propagated to the wheel cylinders WC, and the brake pressure generator 60 is left idle. For this mode of operation, the system valves default to their normally-biased positions. Also, when the simulator hardware is found to have a malfunction at step 216, the controller can trigger and store an error code at step 228. Rather than a generic "system fault" error, the error code can include information identifying that the simulator hardware experienced a fault. Thus, a service technician can more readily identify the source of the problem and more conveniently provide an appropriate repair or replacement. Optionally, the error code may be displayed to the driver in an instrument panel of the vehicle, either in a generic or specific format. The same can be true of the error code triggered at step 206.

When the diagnostic routine proceeds to step 220 after confirming proper operation of the simulator hardware, the system 20 commences brake-by-wire operation in the secondary mode. In this mode, brake pedal actuation is detected by the pedal travel sensor 36, and the driver isolation valves $52_1$, $52_2$ are actuated to close and the simulator isolation valve 84 is actuated to open. As pedal feedback is provided by the pedal feel simulator 80, a braking request of the driver is sensed and reported to the controller by a sensor (e.g., the pedal travel sensor 36) other than the primary or secondary pressure sensors 88, 76. Brake force (i.e., hydraulic fluid pressure) corresponding to the braking request is generated by the brake pressure generator 60 and applied to the corresponding wheel cylinders WC through the respective apply pressure control valves $72_1$, $72_2$.

What is claimed is:

1. A vehicle braking system comprising:
    a master cylinder having an input side configured to receive an input from a brake pedal and an output side configured to provide a master cylinder output,
    at least one braking circuit having at least one wheel cylinder and a brake pressure generator separate from the brake pedal;
    a simulator circuit including a pedal feel simulator coupled to the master cylinder output side through a switchable simulator valve, the pedal feel simulator providing a reaction force to the brake pedal when the switchable simulator valve is in an open position;
    at least one normally-open isolation valve operable to close and isolate the at least one braking circuit from the master cylinder and the simulator circuit;
    a primary pressure sensor operable to generate a braking request signal responsive to the input from the brake pedal; and
    a controller programmed to activate the brake pressure generator to apply a braking force to the at least one wheel cylinder of the braking circuit based on the braking request signal from the primary pressure sensor, the controller further being programmed to close the at least one normally-open isolation valve during activation of the brake pressure generator so that the master cylinder is coupled to the simulator circuit and decoupled from the braking circuit;
    wherein the controller is further programmed to identify an abnormal value for the braking request signal from the primary pressure sensor, and in response, the controller is programmed to open the at least one normally-open isolation valve and to observe a relationship between brake pedal actuation and pressure generated at the master cylinder output side using a secondary pressure sensor that is positioned in the braking circuit such that the controller determines whether the abnormal value is indicative of a primary pressure sensor malfunction or indicative of a malfunction of at least one of the pedal feel simulator and the switchable simulator valve.

2. The vehicle braking system of claim 1, wherein the controller is programmed to switch from a primary brake-by-wire mode that utilizes the primary pressure sensor as an input for the brake pressure generator to a secondary brake-by-wire mode that utilizes a brake pedal travel sensor as an input for the brake pressure generator in response to the determination that the abnormal value is indicative of a malfunction of the primary pressure sensor and not indicative of a malfunction of either of the pedal feel simulator or the switchable simulator valve.

3. The vehicle braking system of claim 2, wherein the master cylinder is a tandem master cylinder and the master cylinder output side includes a first outlet from a first chamber pressurized by a first piston adjacent the brake pedal and further includes a second outlet from a second chamber pressurized by a second piston remote from the brake pedal.

4. The vehicle braking system of claim 3, wherein the at least one braking circuit includes first and second braking circuits respectively coupled to the first and second master cylinder outlets through respective first and second normally-open isolation valves.

5. The vehicle braking system of claim 3, wherein the primary pressure sensor is coupled to the second outlet of the master cylinder.

6. The vehicle braking system of claim 3, wherein the pedal feel simulator is coupled to the first outlet of the master cylinder.

7. The vehicle braking system of claim 1, wherein the brake pressure generator includes a motor-driven piston.

8. The vehicle braking system of claim 1, wherein the braking circuit further includes an apply pressure control valves in the form of a controller-modulated solenoid valve between an output of the brake pressure generator and the at least one wheel cylinder.

9. The vehicle braking system of claim 8, wherein the controller is programmed to hold the apply pressure control valve in an open position to establish fluid communication necessary to observe the relationship between brake pedal actuation and pressure generated at the master cylinder output side using the secondary pressure sensor.

10. The vehicle braking system of claim 1, wherein the controller is programmed to switch from a brake-by-wire mode that utilizes the primary pressure sensor as an input for the brake pressure generator to a secondary mechanical push-through back-up mode that utilizes the brake pedal without using the brake pressure generator or the pedal feel simulator in response to the determination that the abnormal value is indicative of a malfunction of at least one of the pedal feel simulator and the switchable simulator valve rather than a malfunction of the primary pressure sensor.

11. A method of operating a vehicle braking system, the method comprising:
receiving an input from a brake pedal at an input side of a master cylinder and providing a master cylinder output corresponding to the brake pedal input at an output side of the master cylinder output;
closing, by a controller signal, at least one normally-open isolation valve to isolate the output side of the master cylinder from at least one braking circuit having at least one wheel cylinder;
opening, by a controller signal, a switchable simulator valve to open a fluid connection between the master cylinder output side and a simulator circuit including a pedal feel simulator to provide a reaction force to the brake pedal;
generating a braking request signal with a primary pressure sensor responsive to the input from the brake pedal, the braking request signal being sent to a controller;
driving a brake pressure generator of the at least one braking circuit, separate from the brake pedal, with the controller responsive to the braking request signal to achieve braking at the at least one wheel cylinder;
identifying with the controller an abnormal value for the braking request signal from the primary pressure sensor;
sending a controller signal, in response to identifying the abnormal value, to open the at least one normally-open isolation valve and to observe a relationship between brake pedal actuation and pressure generated at the master cylinder output side using a secondary pressure sensor that is positioned in the braking circuit; and
determining with the controller, based on the observed relationship, whether the abnormal value is indicative of a primary pressure sensor malfunction or indicative of a malfunction of at least one of the pedal feel simulator and the switchable simulator valve.

12. The method of claim 11, further comprising automatically switching via the controller from a primary brake-by-wire mode that utilizes the primary pressure sensor as an input for the brake pressure generator to a secondary brake-by-wire mode that utilizes a brake pedal travel sensor as an input for the brake pressure generator in response to the determination that the abnormal value is indicative of a malfunction of the primary pressure sensor and not indicative of a malfunction of either of the pedal feel simulator or the switchable simulator valve.

13. The method of claim 11, wherein the brake pressure generator outputs brake pressure to a first braking circuit through a first control valve and outputs brake pressure to a second braking circuit through a second control valve.

14. The method of claim 13, further comprising modulating an opening amount of each of the first and second control valves with the controller to set a first pressure provided to a first set of wheel cylinders of the first braking circuit and a second set of wheel cylinders of the second braking circuit.

15. The method of claim 13, further comprising holding at least one of the first and second control valves in an open position to establish fluid communication necessary to observe the relationship between brake pedal actuation and pressure generated at the master cylinder output side using the secondary pressure sensor.

16. The method of claim 11, wherein the primary pressure sensor detects fluid pressure at an outlet of the master cylinder coupled to a second chamber pressurized by a second piston remote from a first chamber having a first piston coupled to the brake pedal.

17. The method of claim 16, wherein the pedal feel simulator is actuated from an outlet of the master cylinder coupled to the first chamber.

18. The method of claim 1, wherein driving a brake pressure generator includes sending a control signal to an electric motor that drives a piston.

19. The method of claim 11, further comprising switching from a brake-by-wire mode that utilizes the primary pressure sensor as an input for the brake pressure generator to a secondary mechanical push-through back-up mode that utilizes the brake pedal without using the brake pressure generator or the pedal feel simulator in response to the determination that the abnormal value is indicative of a malfunction of at least one of the pedal feel simulator and the switchable simulator valve rather than a malfunction of the primary pressure sensor.

* * * * *

UNITED STATES PATENT AND TRADEMARK OFFICE
CERTIFICATE OF CORRECTION

PATENT NO.         : 10,046,749 B2
APPLICATION NO.    : 15/373449
DATED              : August 14, 2018
INVENTOR(S)        : Irwan et al.

Page 1 of 1

It is certified that error appears in the above-identified patent and that said Letters Patent is hereby corrected as shown below:

In the Claims

Column 10, Claim 18, Line 60: after the word claim replace the number "1" with the number --11--

Signed and Sealed this
Twenty-third Day of October, 2018

Andrei Iancu
*Director of the United States Patent and Trademark Office*